Patented Oct. 30, 1934

1,979,033

UNITED STATES PATENT OFFICE 1,979,033

PROCESS FOR THE MANUFACTURE OF N-SULPHOETHYL COMPOUNDS OF ARYL-AMINO SULPHONIC ACIDS

Hans Grotowsky and Wilhelm Mühl, Crefeld-Uerdingen, Germany, assignors to I. G. Farbenindustrie Aktiengesellschaft, Frankfort-on-the-Main, Germany No Drawing. Application April 24, 1933, Serial No. 667,763. In Germany May 18, 1932

13 Claims. (Cl. 260—129)

The present invention concerns the manufacture of N-sulphoethyl compounds of arylamino sulphonic acids by reacting on primary or secondary arylamines containing a sulphonic acid radical in any position in the molecule with α-chloroethane-β-sulphonic acid, preferably in the presence of an acid binding agent and preferably in aqueous solution.

In accordance with the invention α-chloroethane-β-sulphonic acid thus enables the sulphoethyl group to be linked smoothly and easily to the nitrogen atom of primary or secondary arylamines containing a sulphonic acid radical in any position in the molecule, either in the nucleus or in a side chain.

As examples of the arylamino sulphonic acids which are accessible to the introduction of the ethylsulphonic acid group in accordance with the invention should be mentioned:— Aniline-2-sulphonic acid, 3-chloro-6-sulphoaniline, monobenzylaniline-3'-sulphonic acid, o-anisidine-3-sulphonic acid (1-amino-2-methoxy-5-sulphobenzene), N-monoethyl-metanilic acid, N-sulphoethyl - m - toluidine, 1-naphthylamine-3-sulphonic acid, 1-naphthylamine-5-sulphonic acid, 1-naphthylamine-7-sulphonic acid, N-monosulphoethyl-β-naphthylamine and α-aminoanthraquinone-2-sulphonic acid.

Acid binding agents can be added to the reaction mixture to bind the hydrogen chloride resulting from the decomposition of α-chloroethane-β-sulphonic acid or salts thereof with arylamino sulphonic acids. For this purpose can be employed, for example, alkali hydroxides and alkaline earth hydroxides, such as sodium hydroxide, potassium hydroxide, calcium hydroxide, basic oxides like zinc oxide, magnesium oxide, calcium oxide, as well as organic bases like diethylaniline, pyridine, quinoline, triethylamine, diethylmethylamine and also salts, which are decomposed by hydrochloric acid with the formation of free acids and chlorides, such as for example carbonates, like sodium carbonate, sodium bicarbonate, potassium carbonate, calcium carbonate and finally salts, such as sodium acetate, sodium benzoate, the alkali salts of naphthalene carboxylic acids, sodium and potassium naphthylamine sulphonates and the like.

The temperature during the reaction may vary according to the conditions. We have obtained good results at atmospheric pressure with temperatures above 75° C. more particularly with temperatures ranging from about 95° to about 180° C., but also higher temperatures may be employed. In the latter case the process must be carried out preferably under elevated pressure, the upper limit for the temperature and pressure being only given by the resistivity of the constructive material of the reaction vessel and the resistivity of the reaction components against decomposition under the conditions employed.

The following examples will further illustrate the invention:—

Example 1

263 kgs. of monobenzylaniline-3'-sulphonic acid (100%) are dissolved in 760 litres of water with the addition of an amount of caustic soda lye necessary to dissolve the sulphonic acid. 370 kgs. of sodium chloroethane sulphonate (45%) are then added and the mixture boiled with stirring and periodical neutralizing of the hydrochloric acid formed by means of caustic soda lye, until acid reaction is no longer produced. This is the case after about 24 hours. Small amounts of impurities are then filtered off and the condensation product can be worked up immediately in solution. But it is also possible to separate the solid ethyl sulphonic acid compound, for example, by evaporating the solution. The yield of the sodium salt of N-ω-sulpho-ethyl-benzyl-aniline-3'-sulphonic acid is almost quantitative. The sodium salt of the formula:—

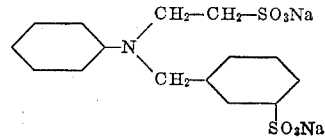

is a colorless crystalline product in the pure state. It is extremely readily soluble in water, difficultly soluble in alcohol and can be recrystallized from dilute alcohol.

The analysis of the salt dried to constant weight at 105° C. gave a content of 3.4% of nitrogen and 15% of sulphur as compared with the calculated content of 3.37% of nitrogen and 15.4% of sulphur.

Example 2

A mixture of 237 kgs. of sulphoethyl-m-toluidine and 600 kgs. of diethylaniline is heated with stirring at 100–140° C. for about 48 hours with 166.5 kgs. of sodium chloroethane sulphonate (100%). The diethylaniline is separated from the reaction product taken up with water by the addition of alkali hydroxide and distilled by means of steam.

The sodium salt of the disulphoethyl-m-toluidine of the formula:—

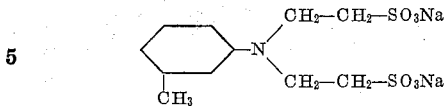

separates in crystalline form on evaporating the aqueous solution.

The sodium salt forms almost colorless small plates which dissolve very readily in hot water, while being less soluble in cold water. The analysis of the salt dried to constant weight gave a content of 3.5% of nitrogen and 17% of sulphur as compared with the calculated quantity of 3.8% of nitrogen and 17.5% of sulphur.

*Example 3*

195 kgs. of aniline-2-sodium-sulphonate are dissolved in 700 litres of water. 175 kgs. of sodium chloroethane sulphonate (100%) are then added and the mixture boiled under reflux with stirring with periodical neutralization of the hydrochloric acid formed with caustic soda lye until an acid reaction is no longer produced. Small amounts of impurities are then filtered off and the filtrate evaporated until crystallization begins. After cooling the solution the disodium salt of N-ω-sulphoethylaniline-2-sulphonic acid of the formula:—

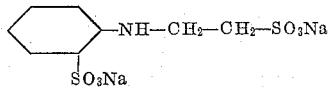

is filtered by suction. The salt is extremely readily soluble in water and can be recrystallized from very small amounts of water.

The reaction can likewise be carried out in such a manner that the reaction mixture is boiled under reflux with stirring for 36 hours and then caustic soda lye or sodium carbonate are added for the purpose of separating the disodium salt.

The anhydrous salt contains according to analysis 4.3% of nitrogen and 19.3% of sulphur as compared with the calculated content of 4.3% of nitrogen and 19.7% of sulphur.

*Example 4*

245 kgs. of the sodium salt of 1-naphthylamine-7-sulphonic acid (100%) are dissolved in 850 litres of water. 335 kgs. of the sodium salt of α-chloroethane-β-sulphonic acid (50%) are then added and the mixture boiled under reflux with stirring with periodical neutralization of the hydrochloric acid formed with caustic soda lye until an acid reaction is no longer produced. This is the case after about 24–30 hours. On cooling the solution the disodium salt of the 1-N-ω-sulphoethyl-naphthylamine-7-sulphonic acid separates as a colorless crystalline product which may be recrystallized from water, the formula of the salt being as follows:

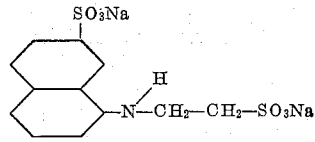

We claim:

1. The process which comprises reacting with α-chloroethane-β-sulphonic acid upon a compound selected from the group consisting of primary and secondary arylamines containing a sulphonic acid radical.

2. The process which comprises reacting in aqueous solution with α-chloroethane-β-sulphonic acid upon a compound selected from the group consisting of primary and secondary arylamines containing a sulphonic acid radical in the presence of an acid binding agent.

3. The process which comprises reacting in aqueous solution with α-chloroethane-β-sulphonic acid upon a compound selected from the group consisting of primary and secondary arylamines of the benzene series containing a sulphonic acid radical in the presence of an acid binding agent.

4. The process which comprises reacting in aqueous solution with α-chloroethane-β-sulphonic acid upon a primary arylamine of the benzene series containing a sulphonic acid radical in the presence of an acid binding agent.

5. The process which comprises boiling an aqueous solution of aniline-2-sodium sulphonate and the sodium salt of α-chloroethane-β-sulphonic acid under reflux with stirring and periodically neutralizing the hydrochloric acid formed with caustic soda lye until an acid reaction is no longer produced, filtering off small amounts of impurities and evaporating the filtrate until crystallization of the sodium salt of N-ω-sulphoethyl-aniline-2-sulphonic acid begins.

6. The process which comprises reacting in aqueous solution with α-chloroethane-β-sulphonic acid upon a compound selected from the group consisting of primary and secondary arylamines of the naphthalene series containing a sulphonic acid radical in the presence of an acid binding agent.

7. The process which comprises reacting in aqueous solution with α-chloroethane-β-sulphonic acid upon a primary arylamine of the naphthalene series containing a sulphonic acid radical in the presence of an acid binding agent.

8. The process which comprises boiling an aqueous solution of 1-naphthylamine-7-sodium sulphonate and the sodium salt of α-chloroethane-β-sulphonic acid under reflux with stirring and periodically neutralizing the hydrochloric acid formed with caustic soda lye until an acid reaction is no longer produced, cooling down the solution obtained until crystallization of the sodium salt of 1-N-ω-sulphoethyl-naphthylamine-7-sulphonic acid begins.

9. N-sulphoethyl compounds of arylamino-sulphonic acids.

10. As new products N-sulphoethyl compounds of arylamino-sulphonic acids of the benzene series.

11. As a new product the disodium salt of N-ω-sulphoethyl-aniline-2-sulphonic acid.

12. As new products N-sulphoethyl compounds of arylamino-sulphonic acids of the naphthalene series.

13. As a new product the disodium salt of 1-N-ω-sulphoethyl-naphthylamine-7-sulphonic acid.

HANS GROTOWSKY.
WILHELM MÜHL.